US011562275B2

(12) United States Patent
Oki et al.

(10) Patent No.: US 11,562,275 B2
(45) Date of Patent: Jan. 24, 2023

(54) DATA COMPLEMENTING METHOD, DATA COMPLEMENTING APPARATUS, AND NON-TRANSITORY COMPUTER-READABLE STORAGE MEDIUM FOR STORING DATA COMPLEMENTING PROGRAM

(71) Applicant: FUJITSU LIMITED, Kawasaki (JP)

(72) Inventors: Yusuke Oki, Kawasaki (JP); Yuta Teranishi, Fukuoka (JP); Yuichiro Soda, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 264 days.

(21) Appl. No.: 16/819,259

(22) Filed: Mar. 16, 2020

(65) Prior Publication Data

US 2020/0302324 A1 Sep. 24, 2020

(30) Foreign Application Priority Data

Mar. 20, 2019 (JP) ............................ JP2019-053455

(51) Int. Cl.
*G06N 7/00* (2006.01)
*G06F 16/28* (2019.01)
(Continued)

(52) U.S. Cl.
CPC ........... *G06N 7/005* (2013.01); *G06F 16/288* (2019.01); *G06N 20/00* (2019.01)

(58) Field of Classification Search
CPC ....... G06N 7/005; G06N 20/00; G06F 16/288
(Continued)

(56) References Cited

U.S. PATENT DOCUMENTS 8,745,058 B1 * 6/2014 Garcia-Barrio ......... G06F 16/44 707/737
2004/0059518 A1 * 3/2004 Rothschild .............. G06F 17/18 702/18

(Continued)

FOREIGN PATENT DOCUMENTS

CA 3079209 A1 * 4/2019 ........... A61B 5/0261
CN 107992536 B * 10/2020 ............ G06F 16/211

(Continued)

OTHER PUBLICATIONS

US 11,422,535 B2, 08/2022, Celia (withdrawn)*

(Continued)

*Primary Examiner* — Emmanuel L Moise
*Assistant Examiner* — Berhanu Shitayewoldetadik
(74) *Attorney, Agent, or Firm* — Fujitsu Patent Center

(57) ABSTRACT

A data complementing method implemented by a computer, the method includes: calculating degree of correlation of a data item corresponding to a missing data value with another data item, in a case where the missing data value exists in a plurality of data records including data values corresponding to a plurality of data items, respectively; performing complementation of the missing data value by a recursive method based on a data item value of the other data item, in a case where the degree of correlation is larger than a predetermined correlation threshold; and performing complementation of the missing data value by a statistical method based on a data value other than the missing data value of a data item corresponding to the missing data value, in a case where the degree of correlation is not larger than the correlation threshold.

7 Claims, 10 Drawing Sheets

(51) Int. Cl.

| | |
|---|---|
| ***G06N 20/00*** | (2019.01) |
| ***G06N 99/00*** | (2019.01) |
| ***H04L 15/16*** | (2006.01) |

(58) Field of Classification Search
USPC .......................................................... 726/12
See application file for complete search history.

(56) References Cited

U.S. PATENT DOCUMENTS

| | | | | |
|---|---|---|---|---|
| 2004/0073534 | A1* | 4/2004 | Robson | G06F 16/284 |
| 2004/0195500 | A1* | 10/2004 | Sachs | G16B 40/10 250/282 |
| 2005/0071300 | A1* | 3/2005 | Bartlett | G06N 20/10 706/12 |
| 2006/0161403 | A1* | 7/2006 | Jiang | G06N 20/00 703/2 |
| 2014/0180755 | A1* | 6/2014 | Prieto | G06Q 10/0635 705/7.28 |
| 2015/0286704 | A1* | 10/2015 | Shyr | G06F 16/35 707/737 |
| 2017/0109678 | A1* | 4/2017 | Chu | G06Q 10/063 |
| 2017/0330109 | A1* | 11/2017 | Maughan | G06N 5/04 |
| 2018/0032876 | A1* | 2/2018 | Altshuller | G06F 16/258 |
| 2019/0026632 | A1* | 1/2019 | Natsumeda | G06N 5/022 |
| 2019/0361926 | A1* | 11/2019 | Rogynskyy | G06F 16/2228 |
| 2020/0242134 | A1* | 7/2020 | Salhin | G06F 16/906 |
| 2022/0093271 | A1* | 3/2022 | Huang | G16H 50/20 |

FOREIGN PATENT DOCUMENTS

| | | | | | |
|---|---|---|---|---|---|
| CN | 106557546 | B | * | 3/2021 | G06F 16/215 |
| CN | 108650065 | B | * | 9/2021 | G06K 9/6276 |
| JP | 2002-215646 | A | | 8/2002 | |
| JP | 2006-350923 | | | 12/2006 | |
| JP | 4676498 | B2 | * | 4/2011 | G06K 9/6218 |
| JP | 2011-154554 | A | | 8/2011 | |
| JP | 2015-60237 | A | | 3/2015 | |
| JP | 2016-064119 | | | 4/2016 | |
| JP | 2017-076205 | | | 4/2017 | |
| WO | WO-2004005891 | A2 | * | 1/2004 | G01N 33/57423 |
| WO | WO-2007043199 | A1 | * | 4/2007 | G06K 9/6218 |
| WO | WO-2011121917 | A1 | * | 10/2011 | G03B 15/00 |
| WO | WO-2011155621 | A1 | * | 12/2011 | G06F 11/0751 |
| WO | WO-2017124940 | A1 | * | 7/2017 | G06K 9/2063 |

OTHER PUBLICATIONS

Masayoshi Takahashi et al., "Comparison of Competing Algorithms of Multiple Imputation—Analysis Using Large-Scale Economic Data-", Research Memoir of Official Statistics, vol. 71, pp. 39-82, Mar. 2014 (Total 44 pages).

Wataru Murayama, "Missing Data Analysis—Full Information Maximum Likelihood Estimation Method and Multiple Imputation Method-", pp. 1-18, Jan. 16, 2011 [Searched on Jan. 30, 2019] Internet <URL:http://koumurayama.com/koujapanese/missing_data.pdf> (Total 33 pages).

JPOA—Office Action of Japanese Patent Application No. 2019-053455 dated Nov. 15, 2022 with English Translation.

* cited by examiner

FIG. 2

$X_{ij}$ ATTRIBUTE j →

RECORD i ↓

| COMPANY No. | CLOSING MONTH | SALES AMOUNT | EXPORT SALES AMOUNT | NUMBER OF EMPLOYEES | LABOR COST | … | SALES COST | GROSS PROFIT ON SALES |
|---|---|---|---|---|---|---|---|---|
| 1 | 3/15/2017 | 8000 | 600 | 23350 | 60.5 | … | 6000 | 402.0 |
| 2 | 3/15/2017 | 400 | 200 | 8800 | 23.0 | … | 300 | 83.1 |
| 3 | 9/25/2017 | 120 | 25 | 900 | 2.3 | … | 100 | 15.6 |
| … | … | … | … | … | … | … | … | … |
| X | 3/5/2018 | 150 | 15 | 1521 | 8.2 | … | 125 | 12.1 |
| Y | 3/15/2018 | 100 | 400 | 3011 | 15.8 | … | 1200 | 105.5 |
| Z | 3/15/2018 | 980 | 30 | 30 | 0.4 | … | 840 | 83.1 |

FIG. 4

| COMPANY No. | CLOSING MONTH | SALES AMOUNT | EXPORT SALES AMOUNT | NUMBER OF EMPLOYEES | LABOR COST | … | SALES COST | GROSS PROFIT ON SALES |
|---|---|---|---|---|---|---|---|---|
| 1 | 3/15/2017 | 8000 | 600 | 23350 | 60.5 | … | 6000 | ~~402.0~~ 400.0 |
| 2 | 3/15/2017 | ~~400~~ 550 | ~~200~~ 250 | ~~8800~~ 7300 | 23.0 | … | ~~300~~ 400 | 83.1 |
| 3 | 9/25/2017 | 120 | 25 | ~~900~~ 1500 | ~~2.3~~ 3.5 | … | 100 | 15.6 |
| … | … | … | … | … | … | … | … | … |
| X | 3/5/2018 | 150 | 15 | 1521 | 8.2 | … | 125 | 12.1 |
| Y | 3/15/2018 | ~~100~~ 200 | ~~400~~ 250 | 3011 | 15.8 | … | ~~1200~~ 300 | ~~105.5~~ 22 |
| Z | 3/15/2018 | 980 | 30 | ~~30~~ 25 | 0.4 | … | 840 | ~~83.1~~ 80.5 |

FIG. 5

| COMPANY No. | CLOSING MONTH | SALES AMOUNT | EXPORT SALES AMOUNT | NUMBER OF EMPLOYEES | LABOR COST | … | SALES COST | GROSS PROFIT ON SALES | | CORRECT ANSWER LABEL |
|---|---|---|---|---|---|---|---|---|---|---|
| 1 | 3/15/2017 | 8000 | 600 | 23350 | 60.5 | … | 6000 | ~~402.0~~ 400.0 | ⇨ | GROWING COMPANY |
| 2 | 3/15/2017 | ~~400~~ 550 | ~~200~~ 250 | ~~8800~~ 7300 | 23.0 | … | ~~300~~ 400 | 83.1 | ⇨ | SHRINKING COMPANY |
| 3 | 9/25/2017 | 120 | 25 | ~~900~~ 1500 | ~~2.3~~ 3.5 | … | 100 | 15.6 | ⇨ | GROWING COMPANY |
| … | … | … | … | … | … | … | … | … | | … |
| X | 3/5/2018 | 150 | 15 | 1521 | 8.2 | … | 125 | 12.1 | ⇨ | SHRINKING COMPANY |
| Y | 3/15/2018 | ~~100~~ 200 | ~~400~~ 250 | 3011 | 15.8 | … | ~~1200~~ 300 | ~~105.5~~ 22 | | |
| Z | 3/15/2018 | 980 | 30 | ~~30~~ 25 | 0.4 | … | 840 | ~~83.1~~ 80.5 | ⇨ | SHRINKING COMPANY |

FIG. 7

ATTRIBUTE

RECORD

| COMPANY No. | CLOSING MONTH | SALES AMOUNT | EXPORT SALES AMOUNT | NUMBER OF EMPLOYEES | LABOR COST | … | SALES COST | GROSS PROFIT ON SALES |
|---|---|---|---|---|---|---|---|---|
| 1 | 3/15/2017 | 8000 | 600 | 23350 | 60.5 | … | 6000 | ~~402.0~~ |
| 2 | 3/15/2017 | ~~400~~ | ~~200~~ | ~~8800~~ | 23.0 | … | ~~300~~ | 83.1 |
| 3 | 9/25/2017 | 120 | 25 | ~~900~~ | ~~2.3~~ | … | 100 | 15.6 |
| … | … | … | … | … | … | … | … | … |
| X | 3/5/2018 | 150 | 15 | 1521 | 8.2 | … | 125 | 12.1 |
| Y | 3/15/2018 | ~~100~~ | ~~400~~ | 3011 | 15.8 | … | ~~1200~~ | ~~105.5~~ |
| Z | 3/15/2018 | 980 | 30 | ~~30~~ | 0.4 | … | 840 | ~~83.1~~ |

FIG. 8

| COMPANY No. | CLOSING MONTH | SALES AMOUNT | EXPORT SALES AMOUNT | NUMBER OF EMPLOYEES | LABOR COST | … | SALES COST | GROSS PROFIT ON SALES |
|---|---|---|---|---|---|---|---|---|
| 1 | 3/15/2017 | 8000 | 600 | 23350 | 60.5 | … | 6000 | ~~402.0~~<br>400.0 |
| 2 | 3/15/2017 | ~~400~~<br>550 | ~~200~~<br>250 | ~~8800~~<br>7300 | 23.0 | … | ~~300~~<br>400 | 83.1 |
| 3 | 9/25/2017 | 120 | 25 | ~~900~~<br>1500 | ~~2.3~~<br>3.5 | … | 100 | 15.6 |
| … | … | … | … | … | … | … | … | … |
| X | 3/5/2018 | 150 | 15 | 1521 | 8.2 | … | 125 | 12.1 |
| Y | 3/15/2018 | ~~100~~<br>200 | ~~400~~<br>150 | 3011 | 15.8 | … | ~~1200~~<br>300 | ~~105.5~~<br>22 |
| Z | 3/15/2018 | 980 | 30 | ~~30~~<br>25 | 0.4 | … | 840 | ~~83.1~~<br>80.5 |

FIG. 9

| COMPANY No. | CLOSING MONTH | SALES AMOUNT | EXPORT SALES AMOUNT | NUMBER OF EMPLOYEES | LABOR COST | ... | SALES COST | GROSS PROFIT ON SALES |
|---|---|---|---|---|---|---|---|---|
| 1 | 3/15/2017 | 8000 | 600 | 23350 | 60.5 | ... | 6000 | ~~402.0~~ 80.5 |
| 2 | 3/15/2017 | ~~400~~ 2000 | ~~200~~ 250 | ~~8800~~ 1100 | 23.0 | ... | ~~300~~ 400 | 83.1 |
| 3 | 9/25/2017 | 120 | 25 | ~~900~~ 1100 | ~~2.3~~ 3.5 | ... | 100 | 15.6 |
| ... | ... | ... | ... | ... | ... | ... | ... | ... |
| X | 3/5/2018 | 150 | 15 | 1521 | 8.2 | ... | 125 | 12.1 |
| Y | 3/15/2018 | ~~100~~ 2000 | ~~400~~ 250 | 3011 | 15.8 | ... | ~~1200~~ 400 | ~~105.5~~ 80.5 |
| Z | 3/15/2018 | 980 | 30 | ~~30~~ 1100 | 0.4 | ... | 840 | ~~83.1~~ 80.5 |

FIG. 10

| COMPANY No. | CLOSING MONTH | SALES AMOUNT | EXPORT SALES AMOUNT | NUMBER OF EMPLOYEES | LABOR COST | ... | SALES COST | GROSS PROFIT ON SALES | |
|---|---|---|---|---|---|---|---|---|---|
| 1 | 3/15/2017 | 8000 | 600 | 23350 | 60.5 | ... | 6000 | ~~402.0~~ | → REMOVAL |
| 2 | 3/15/2017 | ~~400~~ | ~~200~~ | ~~8800~~ | 23.0 | ... | ~~300~~ | 83.1 | → REMOVAL |
| 3 | 9/25/2017 | 120 | 25 | ~~900~~ | ~~2.3~~ | ... | 100 | 15.6 | → REMOVAL |
| ... | ... | ... | ... | ... | ... | ... | ... | ... | |
| X | 3/5/2018 | 150 | 15 | 1521 | 8.2 | ... | 125 | 12.1 | → LEARNING RECORD |
| Y | 3/15/2018 | 100 | ~~400~~ | ~~3011~~ | 15.8 | ... | ~~1200~~ | ~~105.5~~ | → REMOVAL |
| Z | 3/15/2018 | 980 | 30 | ~~30~~ | 0.4 | ... | 840 | ~~83.1~~ | → REMOVAL |

DATA COMPLEMENTING METHOD, DATA COMPLEMENTING APPARATUS, AND NON-TRANSITORY COMPUTER-READABLE STORAGE MEDIUM FOR STORING DATA COMPLEMENTING PROGRAM

CROSS-REFERENCE TO RELATED APPLICATION

This application is based upon and claims the benefit of priority of the prior Japanese Patent Application No. 2019-53455, filed on Mar. 20, 2019, the entire contents of which are incorporated herein by reference.

FIELD

The embodiment disclosed herein is related to a data complementing method, and a data complementing apparatus, and a non-transitory computer-readable storage medium storing a data complementing program.

BACKGROUND

Data may include a missing value, for example, a missing value may be included in learning data in machine learning. FIG. 7 illustrates an example of missing values. FIG. 7 illustrates financial statement data of finance as an example of data. In FIG. 7, one record is one piece of data. Each record has attribute values for a plurality of attributes such as a company No., a closing month, a sales amount, an export sales amount, a number of employees, labor cost, sales cost, gross profit on sales, and the like.

In FIG. 7, attribute values to which cancellation lines are applied are missing values. For example, in a record of the company No. "1", a value of the gross profit on sales is not obtained, and is a missing value. The financial statement data of finance contains approximately 400 attributes. There may be a high correlation between these attributes. For example, the number of employees and the labor costs are highly correlated.

When the learning data contains many missing values, learning accuracy is lowered. For this reason, in the machine learning, the missing values are complemented. For example, there is a regression complement by which a missing value is complemented using another attribute value in the record. In the regression complement, a missing value is calculated from another attribute value by using a regression equation. In the regression complement, when there is no attribute having high correlation with the attribute of the missing value, accuracy of complement is low.

There is a statistic complement by which a statistic such as a mean value, a median value, or the like of attribute values of another record is calculated for the attribute of the missing value, and the missing value is complemented by using the calculated statistic. In the statistic complement, when the missing ratio of the attribute of the missing value is high, the accuracy of complement is low. Further, since a plurality of records is complemented with the same statistic, it is not suitable for learning data.

There is a multiple imputation (MI) method and a full information maximum likelihood (FIML) estimation method using both another attribute value in the record and an attribute value of the same attribute of another record.

With the MI, a posterior distribution of missing data is constructed from observed data, and missing values are replaced with M simulation values to generate M complemented datasets. With the MI, a regression coefficient is calculated by using each of M complemented datasets, and a regression coefficient to be used for the regression complement is determined by calculating a mean value of M sets of regression coefficients. The MI is an example of the regression complement because the regression coefficient is used.

With the FIML, a likelihood is calculated by ignoring the missing value for each record, and a mean and variance covariance to maximize the sum of the likelihoods of all records are calculated. With the FIML, the missing value is complemented with the calculated mean. The FIML is an example of the statistic complement because the missing value is complemented with the mean.

As the related art, there is a predictive model learning apparatus which generates a model enabling highly accurate prediction even when some of explanatory variables included in the training data are missing. The predictive model learning apparatus groups training data in which a sample which is a set of an objective variable and an explanatory variable vector is collected into a plurality of pieces. The prediction model learning apparatus performs machine learning of a model using a plurality of prediction models set for each group.

In a case of the machine learning, the prediction model learning apparatus calculates a usage rate of each prediction model constituting a model of an output target with respect to a missing pattern indicating a missing state of components in the explanation variable vector by using an estimated parameter. The predictive model learning apparatus estimates parameter of each prediction model by using the usage rate of each prediction model with respect to the missing pattern. The predictive model learning apparatus alternately repeats the calculation of the usage rate of each prediction model and the estimation of the parameter of each prediction model.

In the related art, there is a missing data complementing system for automatically calculating complementary data of a missing portion of sample data. The missing data complementing system detects missing data in which partial missing of features exists among sample data groups accumulated in a database, and divides the sample data into the missing data and normal data free from the missing. The missing data complementing system obtains the normal data similar to the missing data using a predetermined similarity scale, and assigns data of the feature corresponding to the missing feature of the missing data in the obtained normal data to the missing feature of the missing data, as complementary data, to complement the missing data.

In addition, there is a missing value prediction apparatus which improves prediction accuracy of missing values in matrix shape data. The missing value prediction apparatus estimates a parameter for maximizing likelihood of the data obtained when the function converts a factor matrix is the matrix data among parameters of functions for converting the factor matrix. The factor matrix is a matrix defined for each factor element of one factor in the matrix data containing two factors, and is a matrix expressing features of each factor element of the other factor in the matrix data. The missing value prediction apparatus predicts the missing value of the matrix element in the matrix data by using the estimated parameter and the value of the known matrix element in the matrix data.

Examples of the related art include Japanese Laid-open Patent Publication No. 2015-60237, Japanese Laid-open Patent Publication No. 2002-215646, and Japanese Laid-open Patent Publication No. 2011-154554.

Examples of the related art include Takahashi Masayoshi, Ito Takayuki, "Comparison of Competing Algorithms of Multiple Imputation—Analysis Using Large-Scale Economic Data—", Research Memoir of Official Statistics (71), pp. 39-82, March 2014, and "Missing Data Analysis—Full Information Maximum Likelihood Estimation Method and the Multiple Imputation Method—", [Searched on Jan. 30, 2019], Internet <URL: http://koumurayama.com/koujapanese/missing_data.pdf>.

SUMMARY

According to an aspect of the embodiments, provided is a data complementing method implemented by a computer. The method includes: calculating degree of correlation of a data item corresponding to a missing data value with another data item, in a case where the missing data value exists in a plurality of data records including data values corresponding to a plurality of data items, respectively; performing complementation of the missing data value by a recursive method based on a data item value of the other data item, in a case where the degree of correlation is larger than a predetermined correlation threshold; and performing complementation of the missing data value by a statistical method based on a data value other than the missing data value of a data item corresponding to the missing data value, in a case where the degree of correlation is not larger than the correlation threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of input data;

FIG. 4 illustrates an example of a complementary result;

FIG. 5 illustrates an application example to machine learning;

FIG. 7 illustrates an example of a missing value;

FIG. 8 illustrates an example of reduction in accuracy of complement when MI is applied;

FIG. 9 illustrates an example of reduction in accuracy of complement when FIML is applied; and FIG. 10 illustrates a case where a record including even one missing is removed.

DESCRIPTION OF EMBODIMENT(S)

In a case where one complement method such as MI or FIML is applied uniformly to each record, there is a problem in that the accuracy of complement is reduced even when any complement method is used. For example, in a case of the MI, accuracy of M simulation values is low when the missing ratio is high, and the accuracy of the regression complement is low for the record having only low correlation attributes.

FIG. 8 illustrates an example of reduction in the accuracy of complement in a case where the MI is applied. In FIG. 8, an attribute value to which a cancellation line is applied is a missing value, and a value below the missing value is a complement value. "Sales amount", "export sales amount", "sales cost", and "gross profit on sales" are highly correlated with each other, and "labor cost" and "number of employees" are highly correlated with each other. Therefore, the record of the company No. "3" in which the "labor cost" and the "number of employees" are missing is low in the accuracy of complement. The record of the company No. "Y" where the "sales amount", the "export sales amount", the "sales cost", and the "gross profit on sales" are missing is low in the accuracy of complement.

In a case of the FIML, when the missing ratio is high, the accuracy of the estimated statistic is low, and all missing values are complemented with low accuracy statistic for each attribute, so that the accuracy of complement is low. FIG. 9 illustrates an example of reduction in the accuracy of complement in a case where the FIML is applied. For example, the "sales amount" is complemented with every "2000", and the accuracy of complement is low.

When a record containing even one missing is removed, the number of records required for learning may not be secured in a case where the missing ratio is high. FIG. 10 illustrates a case where a record containing even one missing is removed. As illustrated in FIG. 10, when the record containing even one missing is removed, the number of learning records is limited.

In an aspect, an object of the embodiment is to improve the accuracy of complement of a missing value, for example, to minimize the influence of missing on learning accuracy.

In one aspect of the embodiment, it is possible to improve accuracy of complement of a missing value, and to minimize the influence of missing on learning accuracy, for example.

An embodiment of a data complementing program, a data complementing method, and a data complementing apparatus disclosed in the present application will now be described in detail with reference to the accompanying drawings. Note that the embodiment does not limit the techniques disclosed herein.

Embodiment

Figure 1:
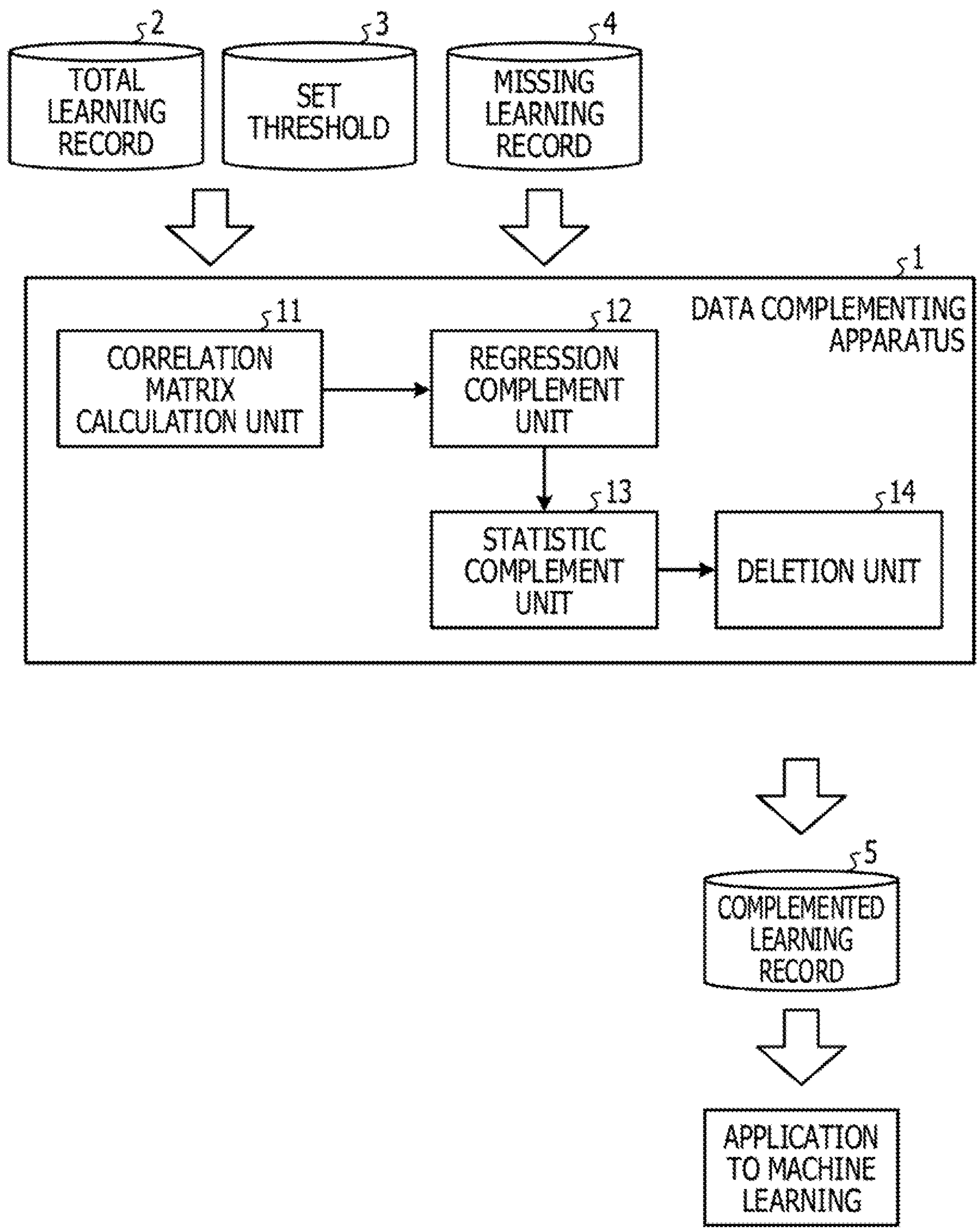
FIG. 1 illustrates a functional configuration of a data complementing apparatus according to an embodiment.

First, a functional configuration of the data complementing apparatus according to the embodiment will be described. FIG. 1 illustrates the functional configuration of the data complementing apparatus according to the embodiment. As illustrated in FIG. 1, a data complementing apparatus 1 according to the embodiment includes a correlation matrix calculation unit 11, a regression complement unit 12, a statistic complement unit 13, and a deletion unit 14.

The correlation matrix calculation unit 11 inputs a total learning records 2 and a missing threshold, and calculates a correlation matrix indicating correlation between the attributes. The missing threshold is included in a set threshold 3. For example, the correlation matrix calculation unit 11 accepts a data complement instruction selected by a user from a menu screen of a terminal by using a mouse, and reads the total learning records 2 and the missing threshold from a file. The correlation matrix calculation unit 11 may accept the missing threshold input by the user from the terminal by using the mouse or a keyboard.

FIG. 2 illustrates an example of input data. As illustrated in FIG. 2, $X_{ij}$ represents an attribute value of an attribute j in a record i. i ($0 \le i \le N$) is a record number, and j ($1 \le j \le J$) is an attribute number. The input data includes a missing value. Equations (1) and (2) represent a correlation matrix C calculated by the correlation matrix calculation unit 11.

$$C=\begin{pmatrix}\rho_{11} & \cdots & \rho_{1J}\\ \vdots & \rho_{j1j2} & \vdots\\ \rho_{J1} & \cdots & \rho_{JJ}\end{pmatrix} \quad (1)$$

$$\rho_{j1j2}=\begin{cases}\dfrac{E[(X_{ij1}-E[X_{ij1}])(X_{ij2}-E[X_{ij2}])]}{(E[(X_{ij1}-E[X_{ij1}])^2]E[(X_{ij2}-E[X_{ij2}])^2])^{1/2}} & \text{if } 1-K_{j1}>T_k \text{ and } 1-K_{j2}>T_k\\ 0 & \text{if } 1-K_{j1}\leqq T_k \text{ or } 1-K_{j2}\leqq T_k\end{cases} \quad (2)$$

In Equation (2), $E[X_{ij1}]$ is a mean value of an attribute j1, $E[X_{ij2}]$ is a mean value of an attribute j2, and $E[(X_{ij1}-E[X_{ij1}])(X_{ij2}-E[X_{ij2}])]$ is a mean value of a product of a deviation of the attribute j1 and a deviation of the attribute j2. $(E[(X_{ij1}-E[X_{ij1}])^2]E[(X_{ij2}-E[X_{ij2}])^2])^{1/2}$ is a product of a standard deviation of the attribute j1 and a standard deviation of the attribute j2.

$K_{j1}$ is the missing ratio of the attribute j1 (appearance rate of missing value), and $K_{j2}$ is the missing ratio of the attribute j2. $T_k$ is a missing threshold. As the $T_k$ is larger, the accuracy of complement increases, and the number of records is reduced. By adjusting $T_k$, it is possible to adjust trade-off between the accuracy of complement and the number of records. The correlation matrix calculation unit 11 sets a correlation value (in a case of $1-K_{j1}\leq T_k$ or $1-K_{j2}\leq T_k$) relating to an attribute in which non-missing ratio ($1-K_j$) is equal to or less than the missing threshold to 0 because the accuracy of complement becomes low.

The correlation matrix calculation unit 11 may calculate the correlation matrix by using Equation (3) to Equation (6), which are weighted with, for example, a missing ratio instead of Equation (2). In Equation (3) to Equation (6), since being weighted by the missing ratio, the correlation matrix calculation unit 11 does not set the correlation value to 0 even in a case of $1-K_{j1}\leq T_k$ or $1-K_{j2}\leq T_k$.

$$\rho_{j1j2}=(1-K_{j1})(1-K_{j2})\frac{E[(X_{ij1}-E[X_{ij1}])(X_{ij2}-E[X_{ij2}])]}{(E[(X_{ij1}-E[X_{ij1}])^2]E[(X_{ij2}-E[X_{ij2}])^2])^{1/2}} \quad (3)$$

$$\rho_{j1j2}=\sqrt{(1-K_{j1})(1-K_{j2})}\frac{E[(X_{ij1}-E[X_{ij1}])(X_{ij2}-E[X_{ij2}])]}{(E[(X_{ij1}-E[X_{ij1}])^2]E[(X_{ij2}-E[X_{ij2}])^2])^{1/2}} \quad (4)$$

$$\rho_{j1j2}=e^{1-\frac{1}{(1-K_{j1})(1-K_{j2})}}\frac{E[(X_{ij1}-E[X_{ij1}])(X_{ij2}-E[X_{ij2}])]}{(E[(X_{ij1}-E[X_{ij1}])^2]E[(X_{ij2}-E[X_{ij2}])^2])^{1/2}} \quad (5)$$

$$\rho_{j1j2}=e^{1-\frac{1}{\sqrt{(1-K_{j1})(1-K_{j2})}}}\frac{E[(X_{ij1}-E[X_{ij1}])(X_{ij2}-E[X_{ij2}])]}{(E[(X_{ij1}-E[X_{ij1}])^2]E[(X_{ij2}-E[X_{ij2}])^2])^{1/2}} \quad (6)$$

The regression complement unit 12 reads a missing learning record 4, which is a collection of the learning records containing a missing, and performs the regression complement. The regression complement unit 12 performs the regression complement using only an attribute in which an absolute value (degree of correlation) of the correlation value is larger than the correlation threshold. The correlation threshold is included in the set threshold 3. The regression complement unit 12 reads, for example, the missing learning record 4 and the correlation threshold from a file. The regression complement unit 12 may accept the correlation threshold input by the user from the terminal by using the mouse or the keyboard.

When complementing $X_{ik1}$, the regression complement unit 12 calculates the complement value using the following Equation (7), in a case where the j2 which satisfies $\rho_{k1j2}>Tc$ includes two attributes of n and m, for example. Note that Tc is a correlation threshold.

$$\hat{X}_{ik1}=b_0+b_1X_{in}+b_2X_{im} \quad (7)$$

Here, $b_0$, $b_1$, and $b_2$ are values which minimize Q in the following Equation (8).

$$Q=\sum_{i=0}^{N}(X_{ik1}-(b_0+b_1X_{in}+b_2X_{im}))^2 \quad (8)$$

However, the record i in which one or more attribute values of the attributes k1, n, and m are missing values is excluded.

The statistic complement unit 13 reads the missing learning record 4 subjected to the process performed by the regression complement unit 12, and performs statistic complement by using the FIML. However, the statistic complement unit 13 does not perform complementation because the accuracy of complement becomes low for attributes in which non-missing ratio is equal to or less than the missing threshold. The missing threshold is included in the set threshold 3. The regression complement unit 12 reads, for example, the missing threshold from a file. The regression complement unit 12 may accept the missing threshold input by the user from the terminal by using the mouse or the keyboard.

The statistic complement unit 13 complements $X_{ik2}$ when $1-K_{k2}>T_k$. The statistic complement unit 13 calculates the likelihood for which the missing value is ignored for each record by using Equation (9), and calculates a total likelihood of all records by using Equation (10).

$$L_i(\mu,\Sigma)=\frac{1}{(2\pi^{\frac{p}{2}}|\Sigma|)}\exp\left(-\frac{1}{2}(X_i-\mu)'\Sigma^{-1}(X_i-\mu)\right) \quad (9)$$

$$\log L(\mu,\Sigma)=\log\prod_{i=0}^{N}L_i(\mu,\Sigma)=\sum_{i=0}^{N}\log L_i(\mu,\Sigma) \quad (10)$$

Here, μ is a mean and Σ is variance covariance. |Σ| is a determinant of Σ, (Xi−μ)' is a transposed vector of (Xi−μ), and $\Sigma^{-1}$ is an inverse matrix of Σ.

The statistic complement unit 13 calculates the mean μ and the variance covariance Σ which maximize the total likelihood, and complements the missing value with the mean μ as illustrated in the following Equation (11).

$$\hat{X}_{ik2}=\mu k_2 \quad (11)$$

The deletion unit 14 reads the missing learning record 4 subjected to the process performed by the regression complement unit 12 and the statistic complement unit 13, deletes a record containing the missing value not subjected to complement performed even in the regression complement unit 12 and the statistic complement unit 13, and generates a complemented learning record 5 without a missing. The complemented learning record 5 is applied to machine learning together with a learning record having no missing value.

Figure 3:
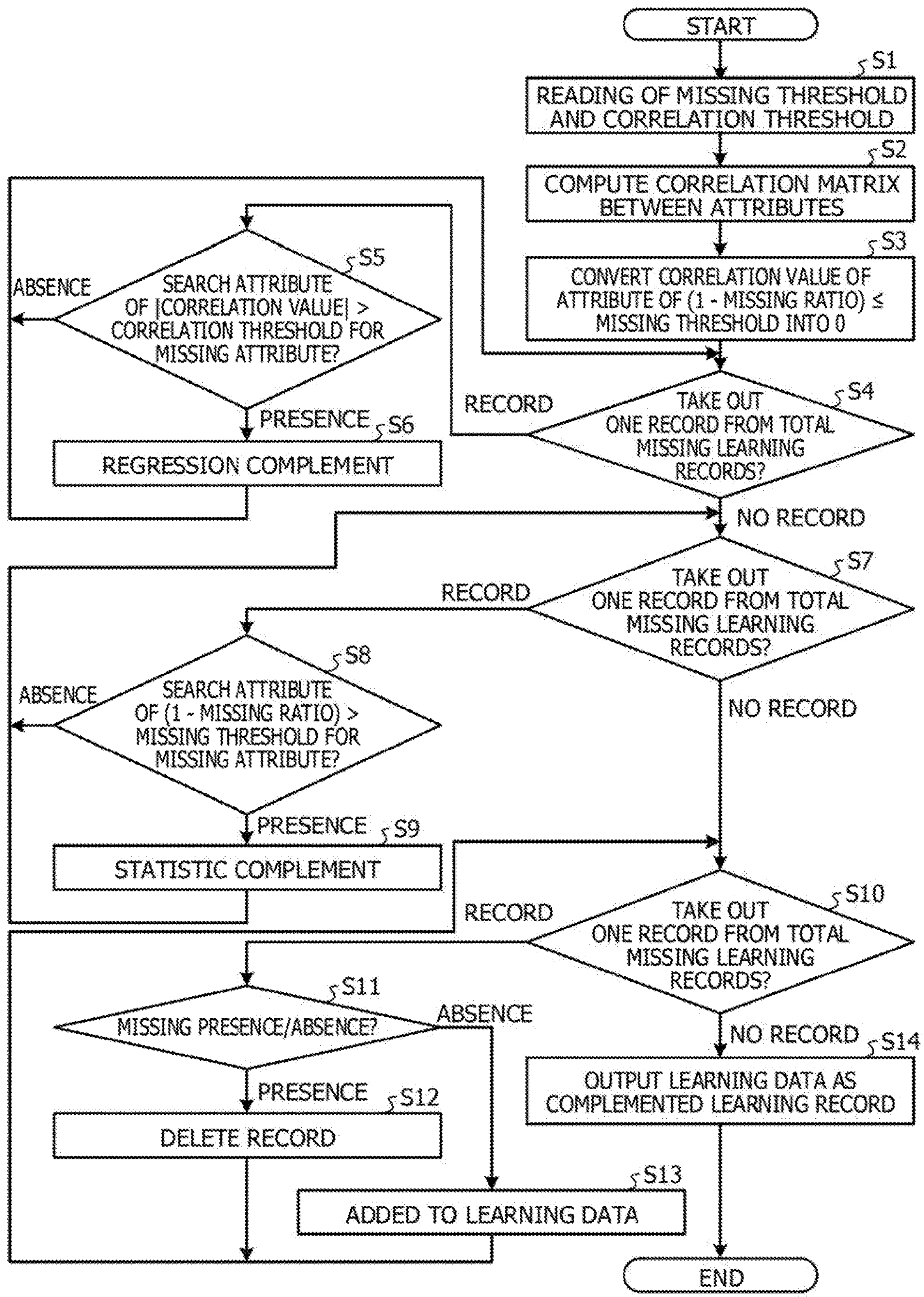
FIG. 3 is a flowchart illustrating a flow of data complement processing by the data complementing apparatus.

Next, a description will be given of a flow of data complement processing by the data complementing apparatus 1. FIG. 3 is a flowchart illustrating the flow of data complement processing by the data complementing apparatus 1. As illustrated in FIG. 3, the data complementing apparatus 1 reads the missing threshold and the correlation threshold (step S1), and calculates the correlation matrix between the attributes by using the total learning records 2 (step S2).

Then, the data complementing apparatus 1 converts the correlation value of the attribute in which (1−missing ratio) is equal to or less than the missing threshold into 0 (step S3). In a case where Equation (3) to Equation (6) are used for calculating the correlation value, the process of step S3 is not performed. The data complementing apparatus 1 takes out one record from the total missing learning records 4, and determines presence/absence of the record (step S4).

In a case where the record is present, the data complementing apparatus 1 searches an attribute in which an absolute value of the correlation value is larger than the correlation threshold for a missing attribute, and determines presence/absence of the attribute in which the absolute value of the correlation value is larger than the correlation threshold (step S5). In a case where the attribute in which the absolute value of the correlation value is larger than the correlation threshold is present, the data complementing apparatus 1 performs the regression complement (step S6), then the process returns to step S4, and in a case where the attribute in which the absolute value of the correlation value is larger than the correlation threshold is absent, the process returns to step S4.

In a case where the record is absent in step S4, the data complementing apparatus 1 takes out one record from the total missing learning records 4 and determines presence/absence of the record (step S7). In a case where the record is present, the data complementing apparatus 1 searches an attribute in which (1−missing ratio) is larger than the missing threshold for the missing attribute, and determines presence/absence of the attribute larger than the missing threshold (step S8). In a case where the attribute larger than the missing threshold is present, the data complementing apparatus 1 performs the statistic complement (step S9), then the process returns to step S7, and in a case where the attribute larger than the missing threshold is absent, the process returns to step S7.

In a case where the record is absent in step S7, the data complementing apparatus 1 takes out one record from the total missing learning records 4 and determines presence/absence of the record (step S10). In a case where the record is present, the data complementing apparatus 1 determines presence/absence of missing of the record (step S11). In a case where the missing is present, the data complementing apparatus 1 deletes the record (step S12), then the process returns to step S10, and in a case where the missing is absent, the data complementing device 1 adds the record to learning data (step S13), then the process returns to step S10.

In a case where the record is absent in step S10, the data complementing apparatus 1 outputs the learning data as the complemented learning record 5 (step S14).

As described above, since the data complementing apparatus 1 performs the regression complement or the statistic complement in accordance with a missing state for each record and each attribute, it is possible to perform appropriate complementation.

FIG. 4 illustrates an example of a complementary result. In FIG. 4, an attribute value without a frame in the lower part of the cell is the complement value by the regression complement, an attribute value with a rectangular frame in the lower part of the cell is the complement value by statistical complement, and an attribute value with an elliptic frame in the lower part of the cell is obtained in a case of failure to perform complement.

As illustrated in FIG. 4, since the attributes with high correlation are found for the records of the company Nos. "1", "2", and "Z", the regression complement is performed. The statistic complement is performed on "number of employees" and "labor cost", which are low in the missing ratio of the record of the company No. "3". The record of the company No. "Y" is not subjected to the regression complement nor the statistic complement, so that the record is deleted.

FIG. 5 illustrates an application example to the machine learning. In FIG. 5, the complemented learning record 5 is used for next year growth forecast of the company (the sales is increased by equal to or more than 20%). As Illustrated in FIG. 5, for example, the record of company number "1" is attached with "growing company" as a correct answer label, and is used as the learning data. The record of the company No. "Y" is not used as the learning data.

As described above, in the embodiment, the correlation matrix calculation unit 11 calculates the correlation matrix between the attributes. In a case where there is an attribute in which an absolute value of the correlation value is larger than the correlation threshold for the missing attribute, the regression complement unit 12 performs the regression complement. In a case where the non-missing ratio is larger than the missing threshold for the missing attribute, the statistic complement unit 13 performs the statistical complement. For this reason, the data complementing apparatus 1 may improve the accuracy of complement of the missing value. Therefore, the data complementing apparatus 1 may minimize the influence of missing of data on the learning accuracy of the machine learning.

In the embodiment, since the record containing the missing value, which has not been subjected to the regression complement nor the statistical complement, is deleted from the learning record, the data complementing apparatus 1 may improve the accuracy of complement.

In addition, in the embodiment, the correlation matrix calculation unit 11 may weight the correlation value with the missing ratio, and may adjust the trade-off between the accuracy of complement and the number of learning records.

The data complementing apparatus 1 may determine whether or not the number of the complemented learning records 5 is sufficient, and when it is not sufficient, the correlation threshold and the missing threshold may be reduced. By adjusting the correlation threshold and the missing threshold, the data complementing apparatus 1 may adjust the trade-off between the accuracy of complement and the number of learning records.

In the embodiment, while the data complementing apparatus 1 has been described, by implementing the configuration of the data complementing apparatus 1 by software, it is possible to obtain a data complementing program having the same function. A computer for executing the data complementing program will now be described.

Figure 6:
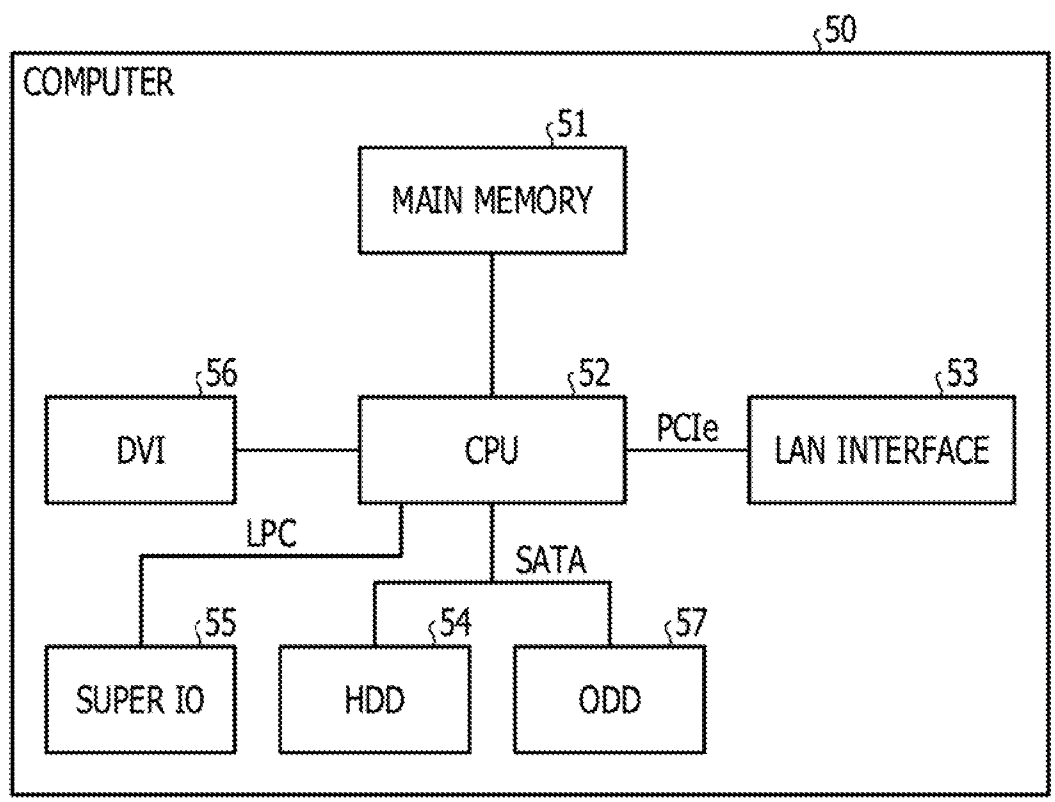
FIG. 6 illustrates a hardware configuration of a computer for executing a data complementing program according to the embodiment.

FIG. 6 illustrates a hardware configuration of the computer for executing the data complementing program according to the embodiment. As illustrated in FIG. 22, a computer 50 includes a main memory 51, a central processing unit (CPU) 52, a local area network (LAN) interface 53, and a hard disk drive (HDD) 54. The computer 50 further includes a super input output (IO) 55, a digital visual interface (DVI) 56, and an optical disk drive (ODD) 57.

The main memory 51 is a memory for storing a program, halfway results of program execution, and the like. The CPU 52 is a central processing unit for reading the program from the main memory 51 and executing the program. The CPU 52 includes a chipset including a memory controller.

The LAN interface 53 is an interface for coupling the computer 50 to another computer through the LAN. The HDD 54 is a disk device for storing a program and data, and the super IO 55 is an interface for coupling input devices such as a mouse or a keyboard. The DVI 56 is an interface for coupling a liquid crystal display device, and the ODD 57 is a device for reading and writing of a digital versatile disc (DVD).

The LAN interface 53 is coupled to the CPU 52 by way of PCI express (PCIe), and the HDD 54 and the ODD 57 are coupled to the CPU 52 by way of Serial Advanced Technology Attachment (SATA). The super IO 55 is coupled to the CPU 52 by way of low pin count (LPC).

The data complementing program executed in the computer 50 is stored in a DVD which is an example of a recording medium capable of being read by the computer 50, is read from the DVD by the ODD 57, and is installed in the computer 50. Alternatively, the data complementing program is stored in a database or the like of another computer system coupled through the LAN interface 53, is read from these databases, or the like, and is installed in the computer 50. The data complementing program thus installed is stored in the HDD 54, is read to the main memory 51, and is executed by the CPU 52.

In the embodiment, although the case where the missing value of the learning record is complemented has been described, the data complementing apparatus 1 may complement another data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium for storing a data complementing program which causes a processor to perform processing, the processing comprising:

in response to detecting of a missing data value in a data base configured to store a plurality of data records each of which includes a plurality of pairs of a data item and a data value, calculating, by the processor, a correlation value indicating degree of correlation of a data item corresponding to a missing data value with another data item;

when an absolute value of the correlation value calculated for the missing data value is larger than a correlation threshold, performing, by the processor, a regression complement on complementation of the missing data value based on a data item value of the other data item; and when a non-missing ratio is larger than a missing threshold, performing, by the processor, a static complement on the missing data value by based on one or more of data values, each of the one or more data values being a data value included in any of the plurality of data records other than a data record to which the missing data value belongs and being associated with the data item corresponding to the missing data value, the non-missing ratio being a ratio indicating a proportion of the one or more data values in the plurality of data records with respect to the data item corresponding to the missing data value.

2. The non-transitory computer-readable storage medium according to claim 1, the processing further comprising: deleting a data record including a missing data value that has not been subjected to processing of performing complementation.

3. The non-transitory computer-readable storage medium according to claim 2 the processing further comprising: processing for adjusting at least one of the correlation threshold and the missing threshold based on the number of deleted data records.

4. The non-transitory computer-readable storage medium according to claim 1, wherein the calculating of the degree of correlation includes setting a correlation value between attributes including an attribute in which a non-missing ratio is equal to or less than the missing threshold to 0.

5. The non-transitory computer-readable storage medium according to claim 1, wherein the calculating of the degree of correlation includes weighting by using a missing ratio of a data item.

6. A data complementing method implemented by a computer, the method comprising:

in response to detecting of a missing data value in a data base configured to store a plurality of data records each of which includes a plurality of pairs of a data item and a data value, calculating, by a processor of the computer, a correlation value indicating degree of correlation of a data item corresponding to a missing data value with another data item;

in response that an absolute value of the correlation value calculated for the missing data value is larger than a correlation threshold, performing, by the processor, a regression complement on complementation of the missing data value by a recursive method based on a data item value of the other data item; and when a non-missing ratio is larger than a missing threshold, performing, by the processor, a static complement on the missing data value by based on one or more of data values, each of the one or more data values being a data value included in any of the plurality of data records other than a data record to which the missing data value belongs and being associated with the data item corresponding to the missing data value, the non-missing ratio being a ratio indicating a proportion of the one or more data values in the plurality of data records with respect to the data item corresponding to the missing data value.

7. A data complementing apparatus comprising:

a memory; and a processor coupled to the memory, the processor being configured to perform processing including:

in response to detection of a missing data value in a data base configured to store a plurality of data records each of which includes a plurality of pairs of a data item and a data value, calculating a correlation value indicating degree of correlation of a data item corresponding to a missing data value with another data item;

when an absolute value of the correlation value calculated for the missing data value is larger than a correlation threshold, performing a regression complement on complementation of the missing data value based on a data item value of the other data item; and when a non-missing ratio is larger than a missing threshold, performing a static complement on the missing data value based on one or more of data values, each of the one or more data values being a data value included in any of the plurality of data records other than a data record to which the missing data value belongs and being associated with the data item corresponding to the missing data value, the non-missing ratio being a ratio indication a proportion of the one or more data values in the plurality of data records with respect to the data item corresponding to the missing data value.

* * * * *